United States Patent
Swearingen et al.

(10) Patent No.: US 12,186,787 B2
(45) Date of Patent: Jan. 7, 2025

(54) CONTROLLED RELEASE ADJUNCT FOR CONTAMINANT TREATMENT

(71) Applicant: Specialty Earth Sciences, LLC, New Albany, IN (US)

(72) Inventors: Lindsay Swearingen, Floyds Knob, IN (US); Jason Swearingen, Floyds Knob, IN (US)

(73) Assignee: Specialty Earth Sciences, LLC, New Albany, IN (US)

( * ) Notice: Subject to any disclaimer, the term of this patent is extended or adjusted under 35 U.S.C. 154(b) by 0 days.

(21) Appl. No.: 17/148,559

(22) Filed: Jan. 13, 2021

(65) Prior Publication Data

US 2021/0213498 A1    Jul. 15, 2021

Related U.S. Application Data

(60) Provisional application No. 62/961,688, filed on Jan. 15, 2020.

(51) Int. Cl.

| | | |
|---|---|---|
| B09C 1/08 | (2006.01) | |
| B09C 1/00 | (2006.01) | |
| C02F 1/70 | (2023.01) | |
| C02F 11/00 | (2006.01) | |
| C02F 103/06 | (2006.01) | |

(52) U.S. Cl.
CPC ............. *B09C 1/08* (2013.01); *B09C 1/002* (2013.01); *C02F 1/705* (2013.01); *C02F 11/004* (2013.01); *B09C 2101/00* (2013.01); *C02F 2103/06* (2013.01)

(58) Field of Classification Search
CPC ....... B09C 1/002; B09C 1/08; B09C 2101/00; B09C 1/00; C02F 2103/06; C02F 1/70; C02F 1/705
USPC ............. 210/107.07, 757; 405/128.75, 128.1
See application file for complete search history.

(56) References Cited

U.S. PATENT DOCUMENTS

| | | | |
|---|---|---|---|
| 2010/0227381 A1* | 9/2010 | Hoag | B09C 1/02 210/170.07 |
| 2013/0315671 A1* | 11/2013 | Swearingen | E21B 7/046 405/128.7 |
| 2013/0316433 A1* | 11/2013 | Huang | B09C 1/08 435/189 |

* cited by examiner

*Primary Examiner* — Claire A Norris
(74) *Attorney, Agent, or Firm* — Witters & Associates; Steve Witters

(57) ABSTRACT

Technologies are described for a process for in situ treatment of contaminated soil(s), water, waste, sludge, wastewater, sediment, other contaminated matrix, or combination thereof. The process comprises applying a reactive or treatment material and an adjunct to the contaminated matrix or in a flow path of the contaminant in the matrix. The adjunct is controllably released into the matrix and contributes to the treatment of the soil(s), water, waste, sludge, wastewater, sediment, other contaminated matrix, or combination thereof.

13 Claims, 8 Drawing Sheets

| REACTOR BATCH ID | VESSEL VOLUME (ml) | VESSEL TYPE | GW VOLUME (ml) | ZVZ MASS (g) | ZVI MASS (g) | SOCORE EDTA MASS (g) | FILTRATION (Y/N) | SAMPLING DATE |
|---|---|---|---|---|---|---|---|---|
| BL-CNF | 250 | Amber septa | 250 | -- | -- | -- | N | 8/8/2019 |
| 3-CNF | 250 | Amber septa | 250 | -- | -- | -- | N | 8/26/2019 |
| BL-CF | 250 | Amber septa | 250 | -- | -- | -- | Y | 8/8/2019 |
| 3-CF | 250 | Amber septa | 250 | -- | -- | -- | Y | 8/26/2019 |
| 3-ZVZ | 250 | Amber septa | 250 | 5.0 | -- | -- | Y | 8/26/2019 |
| 3-ZVZ-E | 250 | Amber septa | 250 | 5.0 | -- | 0.25 | Y | 8/26/2019 |
| 3-ZVI | 250 | Amber septa | 250 | -- | 5.0 | -- | Y | 8/26/2019 |
| 3-ZVI-E | 250 | Amber septa | 250 | -- | 5.0 | 0.25 | Y | 8/26/2019 |
| 3-CF-E | 250 | Amber septa | 250 | | -- | 0.25 | Y | 8/26/2019 |

| REACTOR BATCH ID | VESSEL VOLUME (ml) | VESSEL TYPE | GW VOLUME (ml) | ZVZ MASS (g) | ZVI MASS (g) | SOCORE EDTA MASS (g) | FILTRATION (Y/N) | SAMPLING DATE |
|---|---|---|---|---|---|---|---|---|
| BL-CNF | 250 | Amber septa | 250 | -- | -- | -- | N | 8/8/2019 |
| 3-CNF | 250 | Amber septa | 250 | -- | -- | -- | N | 8/26/2019 |
| BL-CF | 250 | Amber septa | 250 | -- | -- | -- | Y | 8/8/2019 |
| 3-CF | 250 | Amber septa | 250 | -- | -- | -- | Y | 8/26/2019 |
| 3-ZVZ | 250 | Amber septa | 250 | 5.0 | -- | -- | Y | 8/26/2019 |
| 3-ZVZ-E | 250 | Amber septa | 250 | 5.0 | -- | 0.25 | Y | 8/26/2019 |
| 3-ZVI | 250 | Amber septa | 250 | -- | 5.0 | -- | Y | 8/26/2019 |
| 3-ZVI-E | 250 | Amber septa | 250 | -- | 5.0 | 0.25 | Y | 8/26/2019 |
| 3-CF-E | 250 | Amber septa | 250 | | -- | 0.25 | Y | 8/26/2019 |

FIG. 1

| Reactor ID | Date Sampled | Units in ug/L (ppb) | | | | | |
|---|---|---|---|---|---|---|---|
| | | Tetrachloroethene | Trichloroethene | cis-1,2-Dichloroethene | trans-1,2-Dichloroethene | Vinyl Chloride | Total CVOCs |
| BL-CNF | 8/8/19 | 4,150 | 90.7 | 96.1 | < 5 | < 2 | 4,337 |
| 3-CNF | 8/26/19 | 2,880 | 62.1 | 78.4 | < 5 | < 2 | 3,021 |
| BL-CF | 8/8/19 | 2,510 | 53.4 | 60.4 | < 5 | < 2 | 2,624 |
| 3-CF | 8/26/19 | 1,280 | 33.8 | 43.3 | < 5 | < 2 | 1,357 |
| 3-ZVZ | 8/26/19 | < 5 | 320 | 137 | 653 | 2.45 | 1,112 |
| 3-ZVZ-E | 8/26/19 | < 5 | 333.0 | 123 | 584 | 2.36 | 1,042 |
| 3-ZVI | 8/26/19 | 548 | 17.1 | 16.5 | < 5 | < 2 | 582 |
| 3-ZVI-E | 8/26/19 | 408 | 20.8 | 16.5 | < 5 | < 2 | 445 |
| 3-CF-E | 8/26/19 | 1,340 | 37.5 | 46.4 | < 5 | < 2 | 1,424 | ug/L - micrograms per liter
ppb - parts per billion

FIG. 3

| Reactor ID | Date Sampled | Units in ug/L (ppb) | | | | |
|---|---|---|---|---|---|---|
| | | Tetrachloroethene | Trichloroethene | cis-1,2-Dichloroethene | trans-1,2-Dichloroethene | Vinyl chloride |
| 3-CF | 8/26/19 | 1,280 | 33.8 | 43.3 | < 5 | < 2 |
| 3-ZVZ | 8/26/19 | < 5 | 320 | 137 | 653 | 2.45 |
| 3-ZVZ-E | 8/26/19 | < 5 | 333.0 | 123 | 584 | 2.36 |
| 3-ZVI | 8/26/19 | 548 | 17.1 | 16.5 | < 5 | < 2 |
| 3-ZVI-E | 8/26/19 | 408 | 20.8 | 16.5 | < 5 | < 2 | ug/L - micrograms per liter
ppb - parts per billion

| Reactor ID | Date Sampled | Total CVOC's ug/L | Percent Reduction [Total CVOC's] % |
|---|---|---|---|
| 3-CF | 8/26/19 | 1,357 | -- |
| 3-ZVZ | 8/26/19 | 1,112 | 18.1% |
| 3-ZVZ-E | 8/26/19 | 1,042 | 23.2% |
| 3-ZVI | 8/26/19 | 582 | 57.1% |
| 3-ZVI-E | 8/26/19 | 445 | 67.2% | ug/L - micrograms per liter
ppb - parts per billion

FIG. 5

*From Horiba – A Guidebook to Particle Size Analysis ial Application Ser. No. 62/961,688, filed Jan. 15, 2020,
CONTROLLED RELEASE ADJUNCT FOR CONTAMINANT TREATMENT

CROSS-REFERENCE TO RELATED APPLICATIONS

The instant application claims the benefit of U.S. Provisional Application Ser. No. 62/961,688, filed Jan. 15, 2020, the entire contents of which are incorporated herein by reference.

FIELD OF THE DISCLOSURE

The invention relates to enhancing, improving, increasing, and/or extending the reduction and/or treatment of contaminant compounds in contaminated media.

BACKGROUND

Discharges of hazardous materials into the environment have lead to contamination of surface water, soil, and aquifers resulting in potential public health problems and degradation of the land for future use. As used in this specification and appended claims, hazardous materials means chemicals or substances that are either toxic or highly toxic, an irritant, corrosive, a strong oxidizer, a strong sensitizer, combustible, either flammable or extremely flammable, dangerously reactive, pyrophoric, pressure-generating, a compressed gas, a carcinogen, a teratogen, a mutagen, a reproductive toxic agent, suspected of having adverse health effects on humans, or listed or regulated by a government agency as being a hazardous material. For example, the U.S. Environmental Protection Agency (USEPA) has established maximum concentration limits (MCLs) for various hazardous materials in water and soils. For instance, stringent drinking water limits placed on many solvent organic compounds in water can be as low as 0.005 mg/L (parts per billion).

In some cases, subsurface groundwater contaminant plumes having hazardous materials may extend hundreds to thousands of feet from the source of a release of the hazardous material into the environment. These hazardous materials may then be transported into drinking water sources, lakes, rivers, and even basements of homes. The presence of hazardous materials in subsurface soils, surface soils, or soil(s), surface water, groundwater, or other water, waste, sludge, sediment, or other contaminated matrices is a well-documented and an extensive problem. The source of these hazardous materials is often times from industry where the hazardous materials are released onto the soil surface or surface water or even into the subsurface soil and/or groundwater through leaking storage tanks. Many, if not most, of these hazardous materials are capable of moving through the soil under the influence of moving water, gravity, or capillary action and serve as a source of groundwater contamination. As used in this specification and appended claims, soil(s) is to be interpreted broadly to include all naturally occurring material found at or below ground surface (e.g. silts, clays, sands, rock, karsts, organics, tills, etc.).

Soil(s), surface water, groundwater, and wastewater can become contaminated with a variety of hazardous materials, organic and inorganic. For example, the environment may become contaminated with volatile, semi-volatile, and non-volatile organic compounds such as PCBs, gasoline, oils, wood preservative wastes, and other hazardous materials. Such other hazardous materials may include, but not limited to, chlorinated solvents (such as trichloroethylene (TCE), vinyl chloride, tetrachloroethylene (PCE), dichloroethanes), ethylene dibromide, halobenzenes, polychlorinated biphenyls, acetone, ter-butyl alcohol, tert-butyl formate, and anilines. Additional contaminants include compounds containing at least one oxidizable aliphatic or aromatic compound and/or functional group (e.g. atrazine, benzene, butyl mercaptan, chlorobenzene, chloroethylvinyl ether, chloromethyl methyl ether, chlorophenol, chrysene, cyanide ion or organic cyanides, dichlorophenol, dichlorohenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tert-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc). Inorganic hazardous materials may include metals and substances having a mineral origin.

Contaminated soil(s), surface water and groundwater may need to be removed or treated to make it less toxic or to meet regulatory requirements. There are a variety of reactants and methods for treating contaminated soil, surface water, groundwater, and wastewater, both in situ and ex situ.

Impact of waters, soils, sludge, waste, and sediments by chemical constituents is a pervasive and persistent problem. In some cases, these chemical constituents may be capable of movement from the location of release via multiple mechanism, including; groundwater flow, surface water flow, concentration gradient, gravity, partitioning, diffusion, etc. The results can lead to migration and ever-expanding chemical plumes. Regulatory agencies such as the US EPA have established maximum concentration limits (MCL's) for many chemical compounds, which may be hazardous and regarded as contaminants. Many of these compounds can be highly resistant to natural degradation processes and persist in the environment for months, years, and even decades. However, under certain conditions, chlorinated compounds (such as chloroethenes and chloroethanes) can be metabolized by naturally occurring microbes during a biochemical process commonly referred to as reductive dechlorination.

Numerous methods have been employed to treat contaminated soil(s), water, waste, sludge, sediment, or other contaminated matrices such as bioremediation, mechanical treatment, ex situ treatment, in situ treatment, and chemical treatment such as chemical oxidation have been used. Some of these methods may include applying a applying a reactive or treatment material, such as a redox material, to the contaminated matrix. Deficiencies may exist with the present treatment processes. For example, the treatment process may decrease in effectiveness over a period of time. The decrease in effectiveness of the treatment material or treatment process may be due to scaling of treatment material, reduction of permeability of the matrix being treated, or the starvation of one or more constituents that may be a part of the treatment process, for example.

The presently disclosed process for in situ treatment of contaminated soil(s), water, waste, sludge, sediment, or other contaminated matrix may alleviate or mitigate some of the deficiencies of the methods that have been employed to treat contaminated soil(s), water, waste, sludge, sediment, or other contaminated matrices.

SUMMARY

In one aspect of the present disclosure, a process for in situ treatment of contaminated soil(s), water, waste, sludge, wastewater, sediment, or other contaminated matrix, or combination thereof, is provided. The process comprises the steps of: applying a redox material to the contaminated matrix or in a flow path of the contaminant in the matrix; applying an adjunct to the contaminated matrix or in a flow path of the contaminant in the matrix; wherein the adjunct is configured to be controllably released and is selected from the group consisting of chelating agents, ligands, catalysts, and combinations thereof; controlling the release of the adjunct into the matrix; reducing at least one contaminant in the contaminated soil(s), water, waste, sludge, wastewater, sediment, other contaminated matrix, or combination thereof, with the redox material; and contributing to the treatment of the at least one contaminant in the contaminated soil(s), water, waste, sludge, wastewater, sediment, other contaminated matrix, or combination thereof, with the adjunct.

In another aspect of the present disclosure, a process for in situ treatment of contaminated soil(s), water, waste, sludge, wastewater, sediment, other contaminated matrix, or combination thereof is provided. The process comprises the steps of: applying a reactive or treatment material to the contaminated matrix or in a flow path of the contaminant in the matrix; applying an adjunct to the contaminated matrix or in a flow path of the contaminant in the matrix; wherein the adjunct is configured to be controllably released and to contribute to the treatment of the soil(s), water, waste, sludge, wastewater, sediment, other contaminated matrix, or combination thereof; controlling the release of the adjunct into the matrix; treating the soil(s), water, waste, sludge, wastewater, sediment, other contaminated matrix, or combination thereof, with the reactive or treatment material and the adjunct and thereby transforming at least one contaminant into at least one product having less hazardous characteristics than the at least one contaminant.

BRIEF DESCRIPTIONS OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the accompanying drawings, in which:

FIG. 1 shows the contents of reactor batches as constructed for use in the Examples disclosed herein;

FIG. 3 shows a table summarizing the sampling results from the Examples disclosed herein;

FIG. 5 shows a table summarizing the percentage of total CVOC mass reduction observed for redox material observed in the Examples disclosed herein;

DETAILED DESCRIPTION

Figure 2:
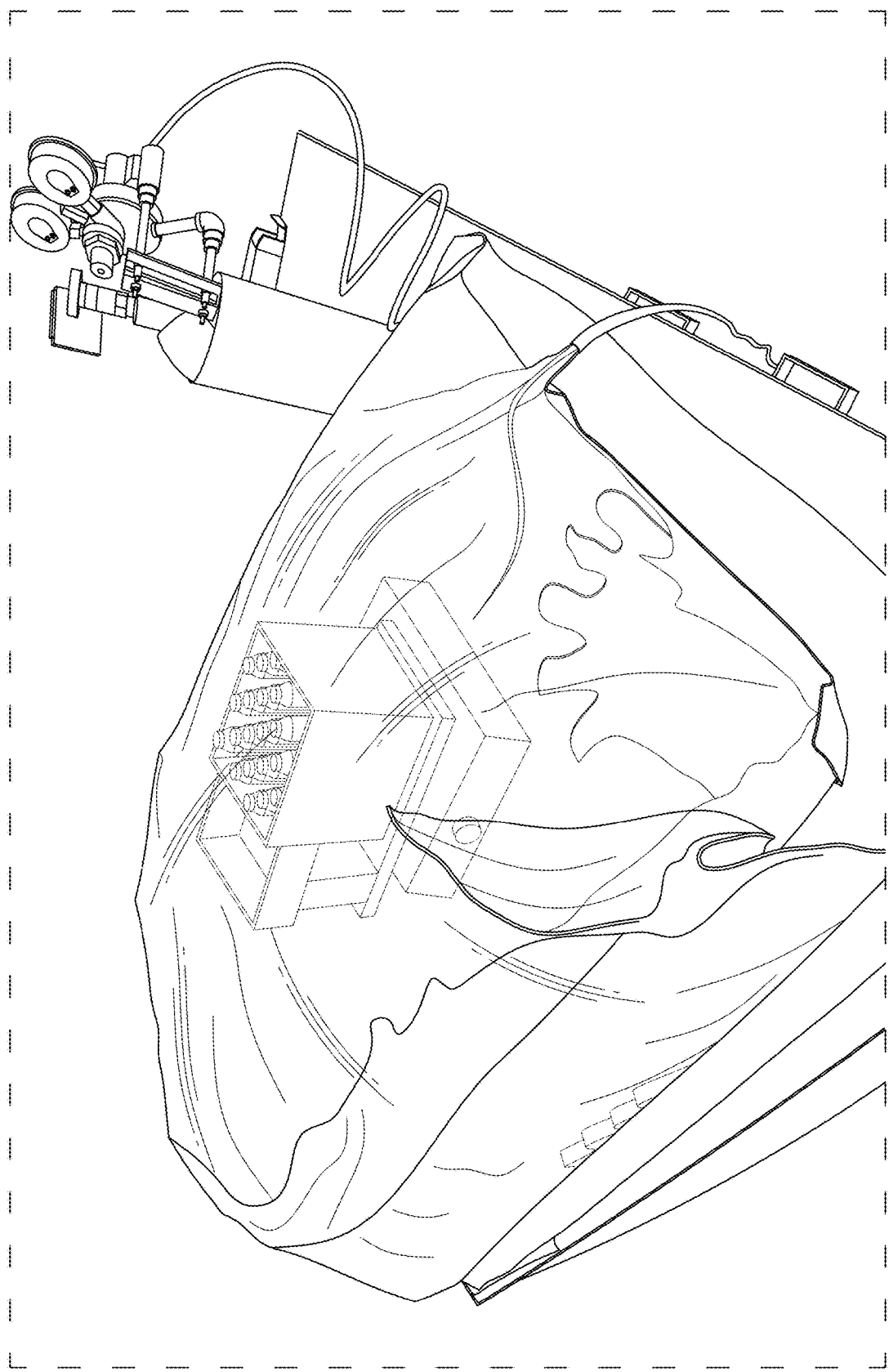
FIG. 2 is a photograph showing the laboratory study set-up as constructed for use in the Examples disclosed herein.

The present invention is directed to enhancing, improving, increasing, and/or extending the reduction and/or treatment of contaminant compounds from water, soil, sludge, waste, air, and sediment with the combination and/or addition of controlled release chelating agent(s), ligand(s), catalyst(s), nutrient(s), organic substrate(s), oxygen releasing compound(s), and/or pH buffering agent(s) to various in situ chemical and/or biological treatment processes.

Disclosed herein is a controlled release adjunct/amendment configured to be controllably released into an environment having at least one contaminant and at least one reactant or at least one biological agent, wherein the at least reactant or the at least one biological agent are configured to transform the at least one contaminant into at least one less harmful constituent The adjunct/amendment may be configured to be disposed with, proximate with, or proximate to the at least one contaminant and the at least one reactant or the at least one biological agent. The adjunct/amendment may have a size, shape, surface area, composition, binding agent or coating for controlling the release of the adjunct/amendment into the environment. The adjunct/amendment may be configured to aid in the transformation of the at least one contaminant into the at least one less harmful constituent, or aid in the dispersion of the products of the transformation, or both.

Numerous publications and research efforts have demonstrated that a wide variety of organic substrates (e.g. carbohydrates and fermentable compounds) can stimulate this Bioremediation reductive dechlorination process. Such substrates can include: glucose and glucose-producing compounds, acetate, propionate, butyrate, benzoate, lactate, formate, methanol, ethanol, humic acids, toluene, molasses, cheese whey, corn steep liquor, oils (both traditional and emulsified forms) including corn oil, peanut oil, coconut oil, soybean oil, hydrogenated cottonseed oil beads; solid food shortening, beef tallow; melted corn oil margarine; filamentous plant material; chitin and hydrogenated soybean. In addition, as the microbes grow on the organic particles, they ferment carbon and release a variety of volatile fatty acids (e.g., acetic, propionic, butyric), which diffuse from the site of fermentation into the contaminant plume and serve as electron donors for additional microbes, including dehalogenators and halorespiring species. Nutrients (eg. yeast extracts, vitamin B10 derivative, enthanesulfonate, sodium sulfite, nitrogen compounds, phosphorus compounds, and buffering agents (eg. sodium carbonate) are also utilized to promote optimal microbial populations and growth conditions. Iron and/or sulfur species are also commonly relied upon to assist in dropping the redox potential and maintain a reduced environment (eg. negative Eh) within the target matrix, which is critical to the reductive dechlorination process.

Traditionally, the aforementioned examples of organic substrates, nutrients, and buffering agents are deployed in sparingly soluble forms (eg. gypsum-calcium sulfate), if available, in an attempt to prolong the longevity of said materials within the target matrix. However, sparingly soluble compounds may be difficult to deploy and typically become coated/covered (rendering them unavailable) or consumed prior to fully contributing to the desired biological reduction process. As such, incomplete contaminant transformation can occur, resulting in the unwanted accumulation of harmful by-products, such as Vinyl Chloride; which are arguably more toxic, more mobile, and more stringently regulated than the original parent compound(s).

In addition to the anaerobic biological treatment processes discussed above (eg. reductive dechlorination), bioremediation of certain categories of unwanted contaminants such as BTEX, PAHs, SVOCs, and/or other petroleum hydrocarbon based compounds can be facilitated by aerobic microbes within an oxidative environment (eg. ORP levels above 0 mV). Similarly, these aerobic biological processes can be enhanced with the addition of certain amendments and/or substrates. Oxygen, for example, is an excellent electron acceptor and traditionally relied upon to help facilitate the desired aerobic bioremediation process. As such, sparingly soluble compounds (eg. calcium peroxide) which provide available oxygen once in solution are often applied to the target media in order to promote an oxygenated environment over extended periods of time. However, as previously discussed, sparingly soluble compounds may be difficult to deploy and typically become coated/passivated (rendering them unavailable) or consumed prior to fully contributing to the desired biological process. As such, incomplete or reduced contaminant treatment is common.

Other traditional methods exist for the treatment of impacted soil, sediment, waste, sludge, and water. Physical removal of contamination by excavation or trenching is one such method. Physical removal may be expensive, disruptive, and may generate large quantities of contaminated waste.

Mechanical treatment of soils, vapors, sediments, wastes, sludge, and water may be done by a number of treatment processes such as; extraction, filtration, air stripping, free-product recovery, dual-phase extraction, multi-phase extraction, air sparging, thermal destruction, and aerobic biostimulation. Mechanical remediation methods may require ongoing operations and maintenance, consume ongoing energy inputs, and can produce waste streams which may require specialized handling and hazardous waste disposal. Mechanical remediation can be disruptive and invasive to properties, and may fall short of achieving chemical concentration reductions below regulatory limits. In addition to the mechanical remediation methods mentioned above, biological digestion is another ex-situ technique for contaminant reduction in impacted media such as sludge and solid waste. Bioreactor vessels may be constructed and augmented with chemical compounds and/or bacteria culture(s) to promote biologically mediated treatment process(es), including sequential reductive dechlorination previously discussed.

In Situ treatment methods have been used to reduce soil, sediment, vapors, wastes, and water impact. In situ techniques reduce or may even eliminate the need for ongoing mechanical system operations, substantial energy consumption, and the generation of large quantities of waste. Both biologically mediated and chemically mediated in situ treatment processes exist.

Chemical oxidation of amenable chemical compounds by injection, application, and/or deployment of oxidizing chemicals such as; ozone, peroxides, persulfates, and permanganates have been used. However, in situ chemical oxidation (ISCO) methods pose a number of technical challenges and limitations. Current methods involving the use of peroxide groups like hydrogen peroxide in conjunction with metallic catalysts (typically chelated and/or complexed) have been shown to be relatively inefficient, often resulting in incomplete contaminant oxidation. Hydrogen peroxide in particular has been found to lack persistence within impacted soils and groundwater due to rapid dissociation.

The use of permanganates has been found to be a more persistent, and arguably more effective oxidizing agent of amenable compounds within a subsurface environment. However, traditional delivery of the permanganate oxidant may require exceedingly large quantities to achieve desired remedial endpoints. Such large quantities of permanganates may be necessary to overcome the natural oxidant demand exerted by the target matrix (eg. soil), thereby limiting the percentage available for treating the chemical compound(s) of concern. Such large quantities may limit the application of this technology due to high cost. Additionally, a potential by-product of the permanganate oxidation reaction is solid manganese dioxide, which can precipitate and clog soils and/or groundwater aquifers, resulting in a reduced permeability; thus reducing the hydraulic conductivity thereof, and thereby inhibiting oxidant access to the contaminant plume; rendering treatment of target compounds incomplete. Further disadvantages of using traditional permanganates alone and in large quantities for subsurface remediation includes the formation of soluble manganese compounds that may exceed drinking water standards. For this and the foregoing reasons, the use of permanganates for traditional in situ remedial applications may not provide the desired result.

Attempts have been made to resolve the disadvantages associated with the use of peroxides and permanganates by incorporating persulfate oxidants into the in situ application. The theory relied on therein utilizes persulfate to satisfy the total oxidant demand of the selected environment (soil, water, sludge, etc.) and then follow up with the permanganate to treat target hazardous organic constituents. However, the total amount of permanganate and persulfate required to treat a large area may be excessive and the extent to which the reactants travel in the aquifer before being spent or reacted may be insufficient. Many of these traditional oxidizing reactants are hazardous and difficult to handle.

Controlled release oxidants have recently been developed by encapsulating solid oxidant particles with various coatings (including water insoluble coatings [e.g. paraffin wax] and/or water soluble coatings, a.k.a. binders [e.g. lignosulfonates] and/or biodegradable polymers [e.g. polycaprolactone] and/or combinations thereof) to produce controlled release products of various shapes, sizes, and formulations. Rather than utilizing large volumes of active oxidant solution, controlled release oxidants are placed into the target matrix (eg. soil, water, waste, air etc) and release said oxidant into solution over time and/or when in contact with the target chemical of concern. Controlled release technology was developed to address some of the technical challenges of traditional ISCO such as; large chemical quantity requirements, surfacing of liquids, displacement of contaminant plumes (due to injection of large volumes of oxidant solutions), short in situ oxidant activity, difficulties with dispersing treatment chemicals into low permeability media (LPM) such as clays, incomplete treatment of the target matrix commonly referred to as "rebound", and the need for multiple and/or repeated injection events.

In situ chemical reduction (ISCR) is another means of remediating chemicals of concern in soil, sediment, waste, and water. Various reducing chemicals (eg. metabisulfite, polysulfide, dithionite, various metals and minerals, including iron, zinc and copper-based constituents) may be applied in similar fashion as ISCO chemicals. However, with ISCR, the contaminants of concern (COC) are treated via chemical reduction reactions rather than via oxidation reactions. ISCR may encounter technical challenges and limitations similar to those of ISCO such as; persistence/longevity of reducing agents in situ, sufficient dosing, sufficient contact with the chemicals of concern, handling of reactive chemicals, contaminant rebounding, and high cost.

Permeable reactive barrier (PRB) installations are another well documented in situ treatment method. Reactive material(s) (eg. oxidants, reductants, bioaugmentation substrates, nutrients, minerals, etc) is typically comingled with a coarse matrix (eg. sand, gravel, hard polymer beads, adsorbent organic matter such as activated carbon [e.g. wood(s), coal(s), and/or coconut shells(s)]), and deployed below ground surface near to, or downstream from, a subsurface source zone or groundwater plume. Thus, forming a subsurface, "wall-like" structure that is porous, allowing contaminant plume(s) to passively flow through the reactive material(s). Upon contact, chemicals of concern/contaminants are destroyed, or substantially destroyed, and/or converted into a less harmful reaction product(s). Zero-valent iron (ZVI) is one of the most commonly applied reactive materials, due to its strong chemical reducant characteristics, cost, and availability. The most common forms of ZVI include; shavings, granules, and/or powders. ZVI and iron related species (eg. ferrous and ferric compounds and ions; and some iron based minerals such as goethite) react with amenable target metal(s) and/or organic compound(s) resulting in transformation and subsequent decreased concentration of said metal(s) and/or organic compound(s). Other zero-valent metals, and related species, such as zero-valent zinc (ZVZ) and zero valent copper (ZVC) are capable of similar reactivity with chemical(s) of concern/contaminant treatment. The formation of precipitates and oxides within the PRB structure can reduce ZVI/ZVZ/ZVC availability and reactivity and may result in "plugging", loss of permeability, and/or reduced flow within the PRB system. Due to the inherent nature of the zero valent metal(s), chemical oxide(s) carbonate(s) (e.g. calcium carbonate), and other hard-minerals can readily form and become deposited over, or adjacent to, the surface of the reactive material(s). Said oxide(s) and/or carbonate(s) formation is commonly referred to as "scaling" (eg. rusting, corrosion, and fouling) and/or "passivation". Decreased available surface area typically results in reduced material reactivity with impacted water flowing into/through the PRB. Therefore, the formation of these unwanted precipitate(s), carbonate(s) and oxide(s) can limit the longevity and reduce the effectiveness of a traditional PRB application.

Scaling, corrosion, fouling, plugging, and permeability loss may similarly occur with the use of organic adsorbent material(s) (eg. activated carbon). For example, the formation of carbonate(s), such as calcium carbonate, has also been shown to deteriorate absorption capacity of activated carbon (e.g. granular activated carbon/GAC, biological activated carbon/BAC, powdered activated carbon/PAC) in treatment applications. (Lee et al; 2003). As previously discussed, in some remediation applications, activated carbon is comingled with other PRB reactive materials. Additionally, activated carbon (e.g. GAC, BAC, PAC) may be employed in other soil and groundwater remediation applications, in surface water treatment, in drinking water treatment, in wastewater applications, in industrial processes (e.g. process water pre-treatment, product purification, etc.) as well as in air treatment and purification applications. Therefore, the formation of unwanted precipitate(s), carbonate(s) and oxide(s) may limit the longevity and reduce the effectiveness of activated carbon materials and processes.

There are documented methods for the treatment of scaling and passivation that include pH reduction, chelation, and sequestration. PH reduction promotes the solubilization of many metal oxide(s). Chelating agent(s), including ligand(s), possess the affinity to dissolve most metal oxide(s) and carbonate(s) deposits through the formation of soluble complex(es).

Chelating agent(s)/ligand(s) have been used in combination with metal(s) for in situ remediation. The highly soluble nature of chelating agent(s)/ligand(s) applied to an ISCR and/or PRB application for the treatment of amenable chemicals of concern within a flowing water system is inherently problematic. Inorganic (eg. metal(s) based) reactive material(s) used in such applications are most often applied in the form of shaving(s), granule(s), powder(s), suspension(s), emulsion(s), and slurry(s). These reactive materials typically do not migrate at the same velocity as the water flowing through the system; thus, keeping them (semi) localized at the point of delivery. Conversely, soluble chelating agent(s)/ligand(s) (eg. ethylenediaminetetraacetic acid [EDTA], diethylenetriaminepentaacetic acid [DTPA], oxalate, etc.) may flow out of the system with groundwater movement. Therefore, once applied, soluble chelating agent(s)/ligand(s) may not remain in contact with the reactive material for any appreciable amount of time. On-going expenses and multiple application of chelating agent(s)/ligand(s) may be required throughout the duration of the chemical(s) of concern/contaminant treatment. EDTA has also been shown to be effective in removing oxides and carbonates (e.g. calcium carbonate) deposits from the surface of activated carbon.

Buffering agents (eg. sodium sulfite, sodium bisulfite, sodium carbonate, phosphate based compounds, etc.) may also be utilized in conjunction with the chelating agent(s)/ligand(s) to influence pH levels within the target area. pH manipulation may be utilized to selectively target specific hard mineral(s) group(s) and/or other problematic compound(s) for dissolution via complexation/chelation.

Catalysts may be added to, or included with, a number of the treatment methods previously mentioned. Catalysts are used to increase reaction rates and/or process efficiencies which may improve treatment outcomes. However, the use of a catalyst(s) in any treatment application may face technical challenges related to product solubility; which are similar to the technical challenge(s) encountered with the use of a chelating agent(s)/ligand(s). Additionally, the relatively short duration of chemical availability with catalyst(s) in solution may present another category of issues which negatively affect the practicality of their use as related to contaminant treatment. In order to increase reaction rates and/or process efficiencies and thereby improve treatment outcomes, catalysts may need to have sufficient contact (both temporally and spatially) with the contaminated media as well as the reactive materials. Though the addition of a catalyst(s) to a chemically mediated treatment process(es) may improve outcomes, the adjunct application may further complicate design and installation logistics.

In addition to the inherent process challenges previously discussed that may be associated with pairing materials, amendments and/or adjuncts with vastly different solubility characteristics, other compatibility problems, unwanted material losses, and/or environmental health and safety concerns may need be considered. Some of the products and processes known to solubilize/dissolve problematic oxides and carbonates may not be appropriate or feasible for use in rejuvenating reactive redox materials. Some are toxic or unsafe/undesirable for use within the environment. Others have been shown to solubilize/dissolve the reactive redox material itself, such as ZVI, to a detrimental extent. Some are effective on only a subset of target byproducts. The US Department of Energy has conducted studies to evaluate the potential for PRB rejuvenation by various solvent solutions such as; sodium acetate, ammonium oxalate, sodium dithionite (sodium hydrosulfite), sodium citrate, hydroxylamine hydrochloride, DTPA, and EDTA with and without buffering across a range of pH's. (Morrison et al, 2004). For example, sodium dithionite (sodium hydrosulfite) was shown to be capable of removing a significant portion of iron oxides from the surface of fouled/passivated ZVI. However, sodium dithionite was unable to remove a significant portion of carbonate deposits from the surface of fouled/passivated ZVI. In contrast, tetrasodium EDTA solution was found to be effective at removing problematic oxides and carbonates from ZVI (typically at pH levels>9). However, when tetrasodium EDTA is applied in solution at a moderate-high concentration, and/or large dosage it also may solubilize/dissolve ZVI to a detrimental extent. As such, suitable chelate(s)/ligand(s) (eg. EDTA) applied at low concentrations, low dosages, over longer periods of time may provide improved results.

Aspects of the present invention may be applicable not only for in situ soil and groundwater remediation, but also for remediation and treatment of surface water, sediments, sludge, waste, and water. Because of the limitations and challenges disclosed above, there is a need for a method and materials for treating amenable chemical(s) of concern/contaminant(s)s in soil, sludge, sediment, waste, and water that does not require ongoing equipment operation, continuous energy consumption, ongoing generation of hazardous and non-hazardous wastes, the use or generation of heat, the injection of reactive chemicals under pressure, or the need for repetitive treatment applications. What is needed are materials that are easy to handle, are persistent in the treatment zone, that react with the target constituent to form less hazardous constituents. What is needed are treatments that are passive, efficient, more effective, and have increased longevity than art before the present invention.

In at least one embodiment of the present invention, a process for in situ treatment of soil(s), water, waste, sludge, sediment, and/or any other suitable matrix is provided comprising the steps of: 1) application of reactive redox material, wherein at least one constituent of said reactive redox material is inorganic and wherein said application of said reactive redox material comprises the steps of: a) placement of said reactive redox material within a contaminant plume and/or targeted matrix (eg. soil(s), water, waste, sludge, sediment, etc.) or in the flow path of a contaminant plume and/or targeted matrix; b) placement of controlled release chelating agent(s)/ligand(s) material in combination with said reactive redox material; c) placement of permeable material (such as sand(s), gravel(s), polymer bead(s), and/or organic adsorbent material(s) such as activated carbon [eg. wood(s), coal(s), and/or coconut shell(s)]) in combination with said reactive redox material and said controlled release chelating agent(s)/ligand(s) material; 2) flowing at least a portion of said contaminant plume through and/or contacting at least a portion of said targeted matrix with at least a portion of said reactive redox material; 3) reacting at least one contaminant contained within at least a portion of said contaminant plume and/or contained within at least a portion of said targeted matrix with at least a portion of said reactive redox material; said resulting reaction or series of reactions capable of transforming said at least one contaminant into at least one product having less hazardous characteristics than said at least one contaminant; 4) releasing at least one chelating agent/ligand from said controlled release chelating agent(s)/ligand(s) material over a period of time exceeding the residence time or contact time of a chelating agent and/or ligand in solution flowing through said at least a portion of said reactive redox material; 5) wherein said controlled release of at least one chelating agent and/or ligand contributes to the reduction, treatment, and/or prevention of scaling and/or passivation of said reactive redox material and/or reduction, treatment, and/or prevention of permeability loss within said target matrix and/or said permeable material due to deposition of unwanted by-product(s).

In another embodiment of the present invention, a process for increasing the in situ efficacy of redox material, deployed in soil(s), water, waste, sludge, sediment, organic adsorbent material, and/or any other suitable matrix is provided comprising the steps of: 1) application of controlled release chelating agent(s)/ligand(s) material within and/or adjacent to said redox material, wherein at least one constituent of said reactive redox material is inorganic and wherein said application of said controlled release chelating agent(s)/ligand(s) material comprises the steps of: a) placement of said controlled release chelating agent(s)/ligand(s) material within and/or adjacent to in situ redox material; b) releasing at least one chelating agent/ligand from said controlled release chelating agent(s)/ligand(s) material over a period of time exceeding the residence time or contact time of a chelating agent and/or ligand applied in solution; c) contacting at least a portion of said redox material with at least a portion of said chelating agent(s)/ligand(s); d) chelating and/or complexing at least a portion of said redox material with at least a portion of said chelating agent(s)/ligand(s) material; 2) wherein said controlled release of at least one chelating agent and/or ligand contributes to the reduction, treatment, and/or prevention of scaling and/or passivation of said redox material within said target matrix.

In yet another embodiment of the present invention, a process for increasing reaction rates and/or process efficiencies of redox material applications in soil(s), water, waste, sludge, sediment, organic adsorbent material, and/or any other suitable matrix is provided comprising the steps of: 1) application of controlled release catalyst material with and/or addition to said redox material, wherein at said application of said controlled release catalyst material comprises the steps of: a) placement of said controlled release catalyst material within and/or adjacent to said soil(s), water, waste, sludge, sediment, organic adsorbent material, and/or any other suitable matrix; b) releasing at least one catalyst from said controlled release catalyst material over a period of time exceeding the residence time, contact time, or half-life of a catalyst applied in solution; c) contacting at least a portion of said redox material with at least a portion of said catalyst; d) contacting at least a portion of said redox material with at least a portion of said soil(s), water, waste, sludge, sediment, organic adsorbent material, and/or any other suitable matrix. 2) wherein said controlled release of at least one catalyst contributes to contaminant reduction within said suitable matrix by said redox material.

In yet another embodiment of the present invention, a process for increasing the in situ efficacy of biological treatment material, deployed in soil(s), water, waste, sludge, sediment, organic adsorbent material, and/or any other suitable matrix is provided comprising the steps of: 1) application of controlled release organic substrate(s), and/or microbial nutrient(s), and/or oxygen releasing compound(s), and/or pH buffering agent(s) within and/or adjacent to biological microbe(s), wherein at least one microbe of said biological microbe(s) is capable of utilizing at least one contaminant of concern for at least one part of a metabolic process, wherein said application of said controlled release organic substrate(s), and/or microbial nutrient(s), and/or oxygen releasing compound(s), and/or pH buffering agent(s) comprises the steps of: a) placement of said controlled release organic substrate(s), and/or microbial nutrient(s), and/or oxygen releasing compound(s), and/or pH buffering agent(s) within and/or adjacent to microbes; b) releasing at least one organic substrate(s), and/or microbial nutrient(s), and/or oxygen releasing compound(s), and/or pH buffering agent(s) from said controlled release organic substrate(s), and/or microbial nutrient(s), and/or oxygen releasing compound(s), and/or pH buffering agent(s) material(s) over a period of time exceeding the residence time or contact time of a organic substrate(s), and/or microbial nutrient(s), and/or oxygen releasing compound(s), and/or pH buffering agent(s) applied in solution; c) contacting at least a portion of said microbes with at least a portion of said organic substrate(s), and/or microbial nutrient(s), and/or oxygen releasing compound(s), and/or pH buffering agent(s) d) improving, increasing, or supporting at least a portion of said microbial metabolic process with at least a portion of said organic substrate(s), and/or microbial nutrient(s), and/or oxygen releasing compound(s), and/or pH buffering agent(s); 2) wherein said controlled release organic substrate(s), and/or microbial nutrient(s), and/or oxygen releasing compound(s), and/or pH buffering agent(s) contributes to, whether directly or indirectly, the reduction and/or treatment of at least one contaminant of concern within the target matrix.

As previously described, the present invention is applicable not only for in situ soil and groundwater remediation, but also for remediation and treatment of surface water, sediments, sludge, and wastewater. There may be a need for a method and materials for treating amenable chemical(s) of concern/contaminant(s) in soil, sludge, sediment, waste, and water that may not require ongoing equipment operation, continuous energy consumption, ongoing generation of hazardous and non-hazardous wastes, the use or generation of heat, the injection of reactive chemicals under pressure, or the need for repetitive treatment applications. What may be desired are materials that are easy to handle, are persistent in the treatment zone, that react with the target constituent to form less hazardous constituents. Treatments that are passive, efficient, more effective, and have increased longevity may be achieved with the present disclosure.

In the following, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 8:
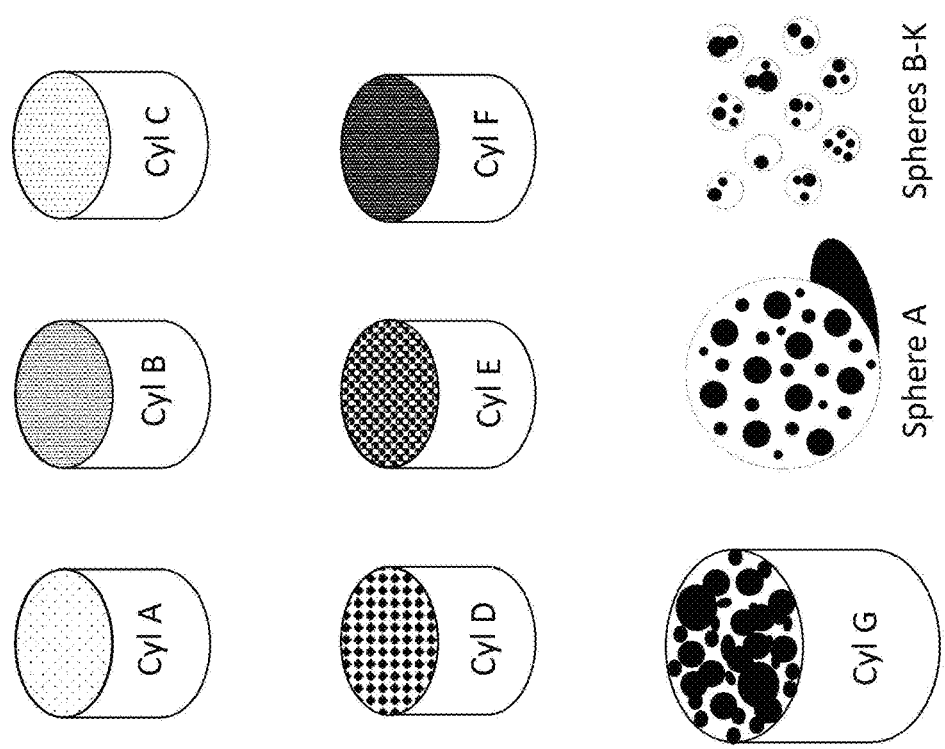
FIG. 8 shows illustrative examples of controlled release materials that may be used in performing the presently disclosed process.
Figure 8:
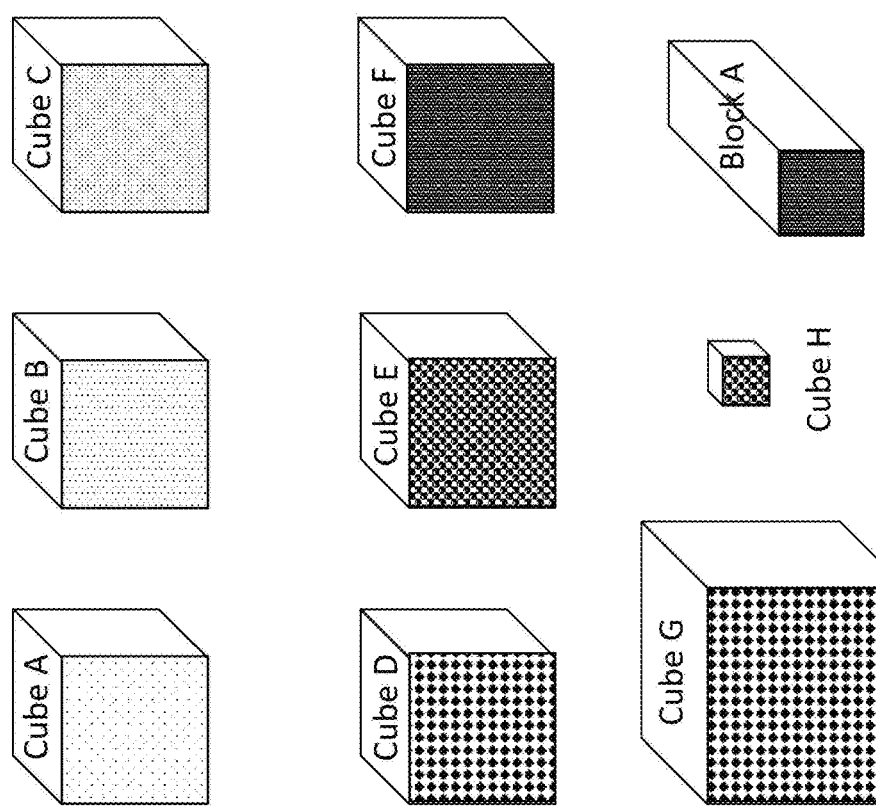

Presently disclosed are materials and methods for the controlled release of adjunct(s) and/or amendment(s) such as catalyst(s), chelating agent(s)/ligand(s), nutrient(s), pH buffering agent(s), organic substrate(s) [a.k.a. electron donors], oxygen releasing compound(s) [a.k.a. electron acceptors], reducing agents may be achieved by multiple mechanisms, including; encapsulation with various coatings (including water insoluble coatings, e.g. paraffin wax and/or water soluble coatings, a.k.a. binders, e.g. lignosulfonates and/or biodegradable polymers, e.g. polycaprolactone) to produce controlled release products of various shapes, sizes, and formulations. The size and shape of the finished product may also be arranged, manipulated, and/or engineered to achieve controlled release. For example, a 100 gram chlorine tablet will dissolve slower in water than will 100 grams of chlorine powder. The ratio of material surface area relative to volume affects the dissolution rate and/or release rate of the material. This association is used to our advantage in the design and manufacture products such as chlorine tablets which provide a steady release of the active ingredient over an extended period of time. A sphere has the smallest surface area to volume ratio of all three-dimensional shapes, and therefore will facilitate the slowest controlled release rate when shape is accounted for in product design. The size of the finished product also affects the controlled release rate. (See FIG. 8, Cubes A-H, Cyls A-G, and Spheres A-K). FIG. 8 shows multiple examples of controlled release materials in various combinations of finished product sizes, finished product shapes, active agent particle sizes, active agent particle size distributions, and ratios of active agent mass loading. For example, 10 spherical chlorine tablets weighing 10 grams each will release their entire 100 grams of chlorine into solution quicker than will a 100 gram spherical chlorine tablet. (See FIG. 8, Sphere A and Spheres B-K) Binding agents, both water soluble and non-soluble, may be used in the manufacturing of controlled release products such as tablets, pellets, and extend release capsules.

The mass loading of adjunct/amendment of the present disclosure may also be engineered or arranged to control the release characteristics of the adjunct/amendment from a dispersion/finished product. For example, a controlled release material with 5% wt/wt mass loading of active agent will have different release characteristics compared to a controlled release material with 50% wt/wt mass loading of active agent compared to a controlled release material with 95% wt/wt mass loading of active agent. (See FIG. 8, Cubes A-F and Cyls A-F).

Figure 6:
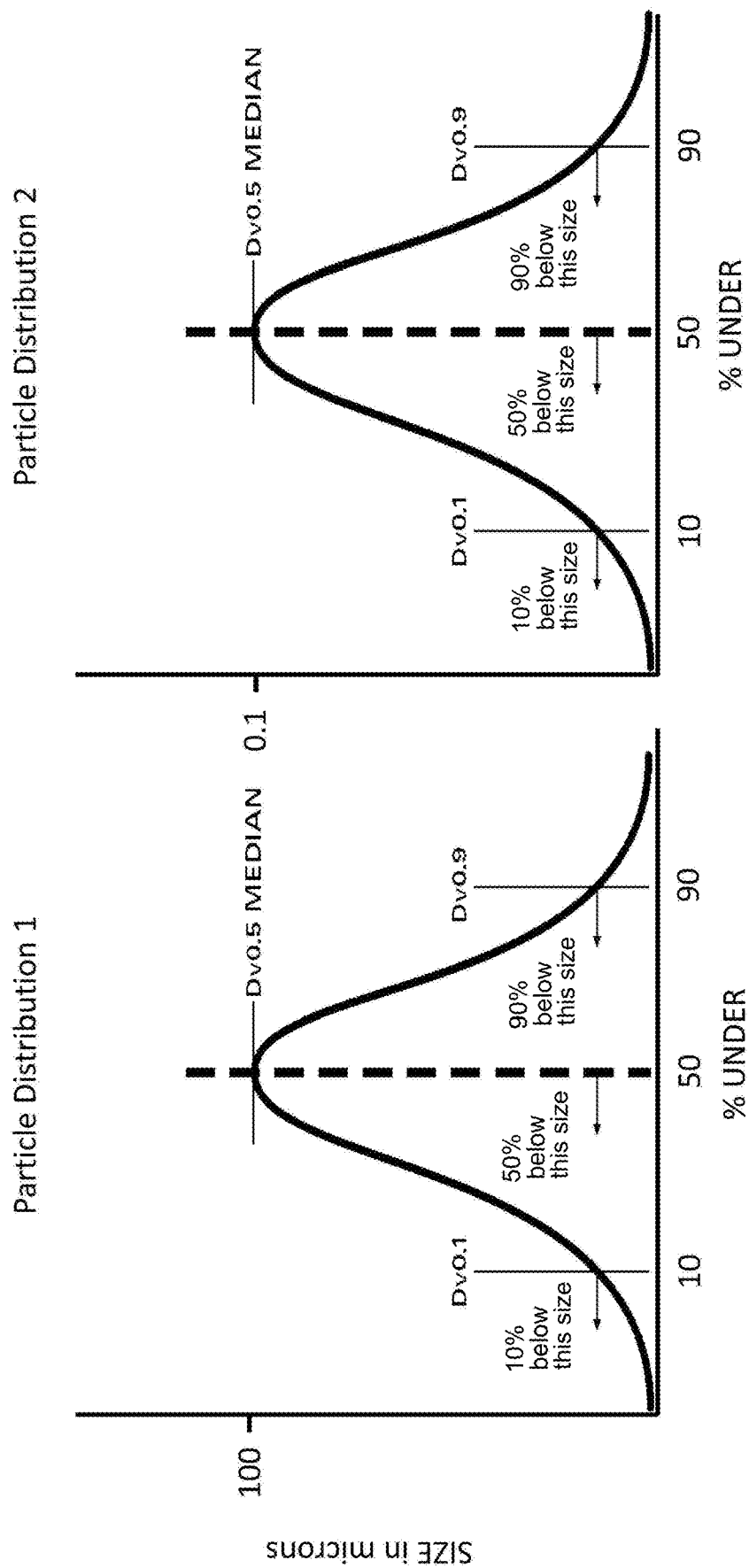
FIG. 6 shows examples of various particle distribution types.

In addition to engineering, manipulating, and/or arranging the mass loading of the adjunct/amendment, the particle size of the solid active agent may be engineered, manipulated, and/or arranged to control the release characteristics of the adjunct/amendment from a dispersion/finished product. Mean/median particle size as well as particle size distribution may influence release characteristics. For example, two products with equivalent shape, size, and disodium EDTA mass loading may have different release characteristics based on the particle size and/or distribution of the disodium EDTA material used to manufacture the finished product. A controlled release product which is manufactured with disodium EDTA having a mean particle size of 0.1 microns may have different release characteristics compared to an equivalent controlled release product which is manufactured with disodium EDTA having a mean particle size of 0.5 microns, or 100 microns, or 500 microns. (See FIG. 8, Cubes A-F and Cyls A-F). In another example, two products with equivalent shape, size, and sodium sulfite mass loading may have different release characteristics based on the distribution of the sodium sulfite material used to manufacture the finished product. FIG. 6 shows 2 different examples of various particle distribution types. Particle Distribution 1 has a median particle size of 100 microns and Particle Distribution 2 has a median particle size of 0.1 microns. A controlled release product which is manufactured with sodium sulfite having a particle distribution as shown in Particle Distribution 1 of FIG. 6 may have different release characteristics compared to an equivalent controlled release product which is manufactured with sodium sulfite having a particle distribution as shown in Particle Distribution 2 of FIG. 6.

Figure 7:
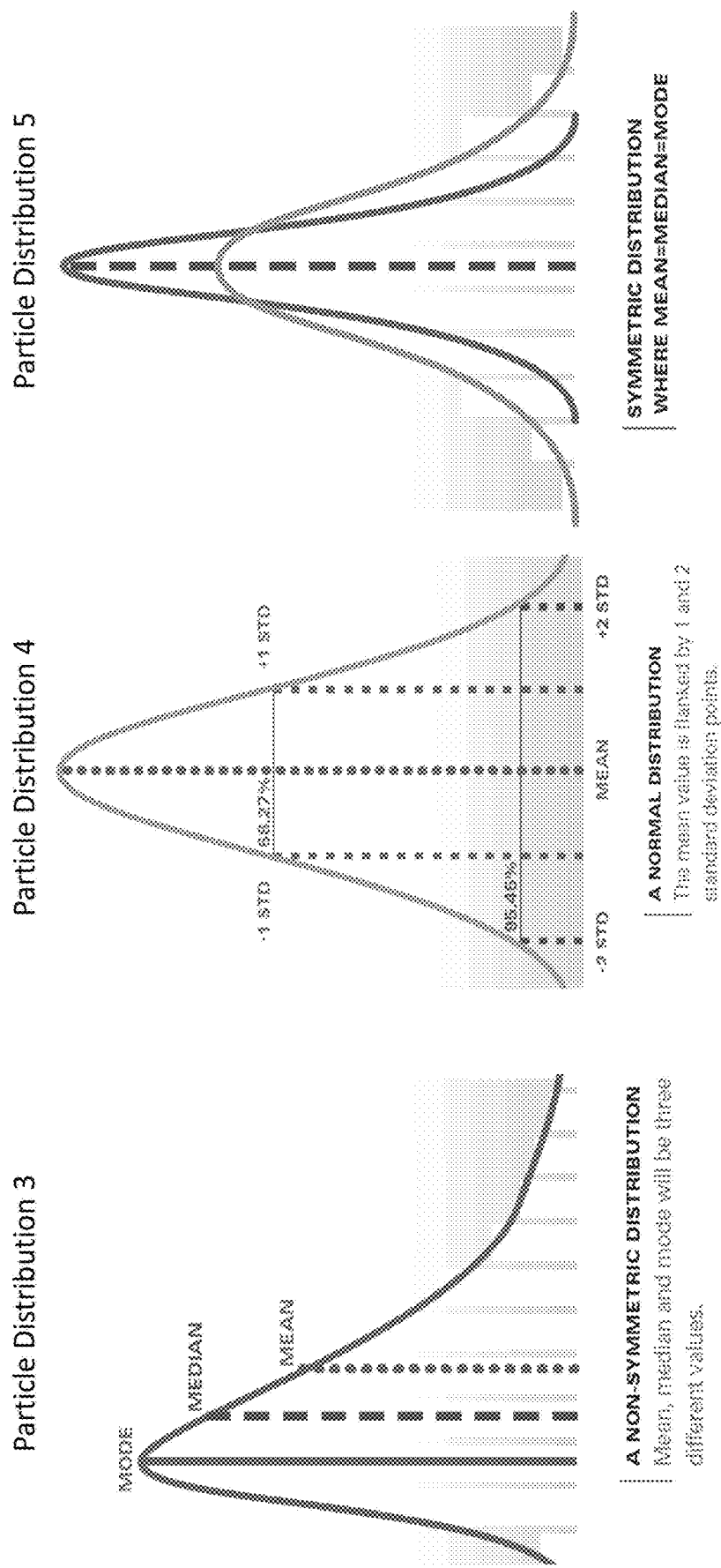
FIG. 7 shows other examples of various particle distribution types.

FIG. 7 shows 3 different examples of various particle distribution types. Particle Distribution 3 is non-symmetric, where the mean, median, and mode each have different values. Particle Distribution 4 is normal, where the mean value is flanked by 1 and 2 standard deviation points. Particle Distribution 5 is symmetric, where the mean, median, and mode are all the same value. Controlled release product which are manufactured with sodium sulfite having particle distributions, as shown in Particle Distributions 3-5 of FIG. 7, may all have different release characteristics, as would Cyl G and Spheres A-K of as shown in FIG. 8.

All of the various controlled release mechanisms discussed above and combinations thereof can be employed in the production of the controlled release catalyst(s), chelating agent(s)/ligand(s), nutrient(s), pH buffering agent(s), organic substrate(s) [a.k.a. electron donors], oxygen releasing compound(s) [a.k.a. electron acceptors], and reducing agent(s) of the present invention.

In one embodiment of the present invention, a process for in situ treatment of soil(s), water, waste, sludge, sediment, and/or any other suitable matrix is provided. In another embodiment of the present invention, a process for increasing the in situ efficacy of redox material, deployed in soil(s), water, waste, sludge, sediment, organic adsorbent material, and/or any other suitable matrix is provided. The performance, efficiency, and/or longevity of in situ contaminant treatment of target matrices by application of reactive redox material is increased with the in situ application and/or addition of controlled release chelating agent(s) and/or ligand(s) material within and/or adjacent to the in situ redox material. Controlled release chelating agent(s) and/or ligand(s) materials can be applied in combination with in situ reactive redox materials upon initial installation of said in situ reactive redox materials to increase the performance, efficiency, and/or longevity of in situ contaminant treatment of target matrices by said in situ reactive redox materials. Also, controlled release chelating agent(s) and/or ligand(s) materials can be applied within and/or adjacent to the location of previously installed/applied in situ redox materials to increase the in situ efficacy of said redox materials, deployed in soil(s), water, waste, sludge, sediment, organic adsorbent material, and/or any other suitable matrix. In other words, controlled release chelating agent(s) and/or ligand(s) materials when applied in combination with and/or adjacent to in situ reactive redox materials may increase contaminant reduction. This increase in contaminant reduction may occur by one of several mechanisms or a combination thereof.

Mechanisms for increased contaminant reduction include, but are not limited to: reduction of scaling and/or passivation of reactive redox material, treatment of scaling and/or passivation of reactive redox material, prevention of scaling and/or passivation of reactive redox material, reduction of permeability loss within target matrices and/or permeable materials due to deposition of unwanted by-product(s), treatment of permeability loss within target matrices and/or permeable materials due to deposition of unwanted by-product(s), and/or prevention of permeability loss within target matrices and/or permeable materials due to deposition of unwanted by-product(s), sustaining the increased reaction rates and/or treatment efficiencies that result from the addition of chelating agent(s) and/or ligand(s) to an in situ reactive redox application.

EXAMPLE

A laboratory reactor batch study was undertaken as by way of an example to evaluate and compare the chlorinated volatile organic hydrocarbon (primarily Tetrachloroethene, Trichloroethene, Dichloroethene isomers, and Vinyl Chloride) reduction and performance of substantially passivated ZVI and substantially passivated ZVZ with and without the addition of controlled release EDTA chelating agent in an anoxic environment. This study is hereby shown as an example.

In the laboratory reactor batch example, the chlorinated volatile organic hydrocarbon (primarily Tetrachloroethene, Trichloroethene, Dichloroethene isomers, and Vinyl Chloride) reduction and performance of substantially passivated, fouled ZVI and substantially passivated, fouled ZVZ with and without the addition of controlled release EDTA chelating agent in an anoxic environment was evaluated.

Each reactor was constructed with 250 ml of composited, homogenized CVOC-impacted groundwater. A number of experimental controls were included in the three-week study. Filtered baseline (BL-CF) and non-filtered baseline (BL-CNF) samples were collected on day one of the study. Additionally, two un-augmented reactors were constructed for the purpose of collecting both filtered (3-CF) and non-filtered (3-CNF) samples at the end of the three-week study. All remaining study reactors were constructed as follows:

3-ZVZ: 5.0 g of passivated ZVZ was added to reactor 3-ZVZ.

3-ZVZ-E: 5.0 g of passivated ZVZ and 0.25 g of controlled-release EDTA was added to reactor 3-ZVZ-E.

3-ZVI: 5.0 g of passivated ZVI was added to reactor 3-ZVI.

3-ZVI-E: 5.0 g of passivated ZVI and 0.25 g of controlled-release EDTA was added to reactor 3-ZVI-E.

3-CF-E: 0.25 g of controlled-release EDTA was added to reactor 3-CF-E.

Reacotrs 3-CF, 3-CNF, 3-ZVZ, 3-ZVZ-E, 3-ZVI, 3-ZVI-E, 3-CF-E were placed on an orbital rocking platform inside a nitrogen-filled glove bag at room temperature for three weeks and then filtered upon sample collection. See FIGS. 1 and 2, wherein FIG. 1 shows the contents of each reactor batch as constructed for use in the example and FIG. 2 is a photograph of the laboratory set-up use in the example, which depicts the nitrogen filled glove bag and orbital rocking platform housing the reactors.

Materials:

For the example, High Grade Zinc 325 mesh powder supplied by Belmont Metals Inc of Brooklyn, NY was used. Zero Valent Iron Size 14D was supplied by Compass Remediation Chemicals of Austin, TX. Prior to constructing the reactors, the ZVZ and ZVI materials were submerged in deionized water in the laboratory. A Marina Model 11134 Aquarium Air Pump was then used to supply a constant stream of ambient air for a period of 5 days to the submerged ZVZ an ZVZ materials resulting in passivation and surface fouling by metal oxide formation on the surface of the ZVI and ZVZ materials. For the example, SOCORE EDTA (61% wt/wt EDTA disodium salt dihydrate), a controlled release chelating agent supplied by Specialty Earth Sciences of New Albany, IN, was used.

For the purpose of determining the extent of CVOC mass reduction attributable to the specific treatment methods evaluated in the example (i.e. ZVI or ZVZ with or without controlled release EDTA), 3-CF represents the baseline CVOC contaminant level(s). See FIG. 3 which is a table summarizing the sampling results from the laboratory study or example.

Figures 4A, 4B:
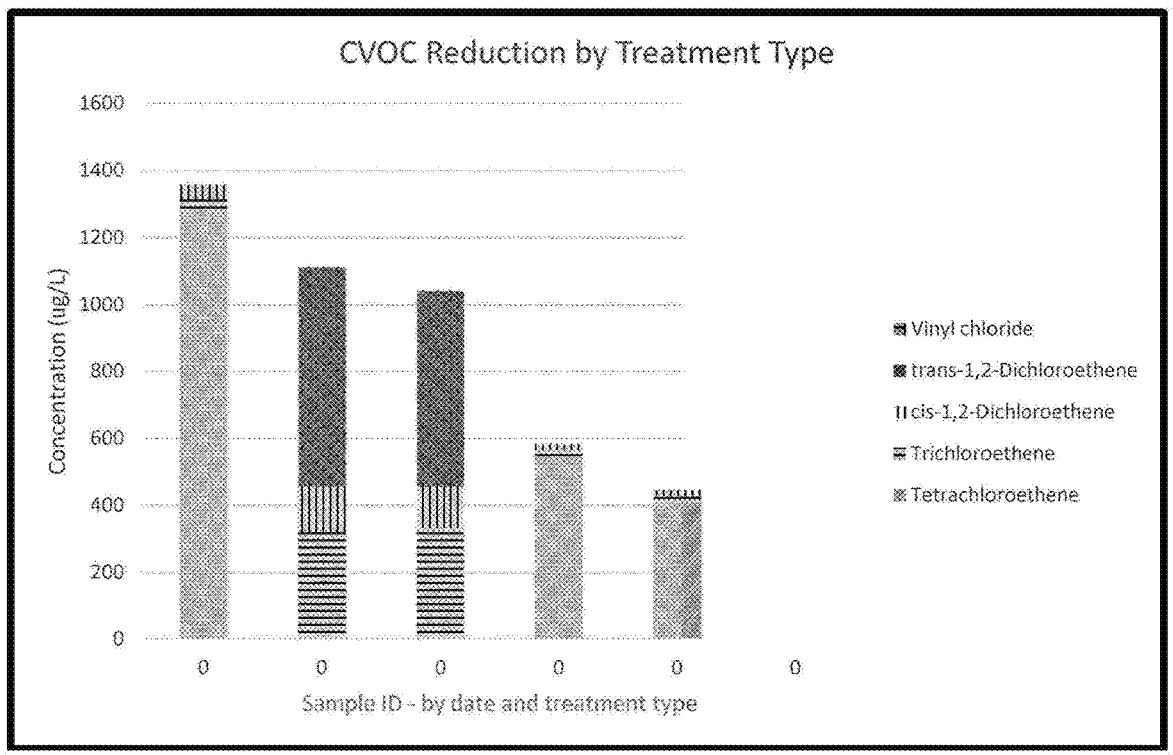
FIGS. 4a and 4b show a depiction of the CVOC concentration reduction trends observed in the Examples disclosed herein.

Results:

Differences can be observed in the specific CVOC concentration reductions and transformations during the three-week period. See FIGS. 4a and 4b which has a graph which depicts the CVOC concentration reduction trends observed for each specific treatment evaluated in the study. Test findings included, but are not limited to, the following:

Tetrachlorethene was the primary CVOC constituent by mass within all baseline control samples.

Trans 1,2-Dichloroethene and Vinyl Chloride were not detected above laboratory reporting limits within any of the four (4) control samples. However, ZVZ and ZVZ-E reactors contained both analytes after ZVZ redox material deployment.

In the study, CVOC mass reduction observed for each specific redox material increased with the addition of controlled release EDTA. See FIG. 5 which is a table summarizing the percentage of total CVOC mass reduction observed for each specific redox material (both with and without controlled release EDTA chelating agent) as compared to the 3-week control sample.

Over the short three-week batch study, ZVZ with controlled release EDTA chelating agent increased the total CVOC mass reduction, as compared to traditional ZVZ, from 18.1% to 23.2%.

ZVI with controlled release EDTA chelating agent increased the total CVOC mass reduction, as compared to traditional ZVI, from 57.1% to 67.2% over the same three-week period.

In another embodiment of the present invention, a process for increasing reaction rates and/or process efficiencies of redox material applications in soil(s), water, waste, sludge, sediment, organic adsorbent material, and/or any other suitable matrix is provided. The application of controlled release catalyst material with and/or addition to said redox material, wherein at said application of said controlled release catalyst material comprises the steps of: a) placement of said controlled release catalyst material within and/or adjacent to said soil(s), water, waste, sludge, sediment, organic adsorbent material, and/or any other suitable matrix; b) releasing at least one catalyst from said controlled release catalyst material over a period of time exceeding the residence time, contact time, or half-life of a catalyst applied in solution; c) contacting at least a portion of said redox material with at least a portion of said catalyst; d) contacting at least a portion of said redox material with at least a portion of said soil(s), water, waste, sludge, sediment, organic adsorbent material, and/or any other suitable matrix. Said controlled release of at least one catalyst contributes to contaminant reduction within said suitable matrix by said redox material.

Reaction rates and/or process efficiencies of redox material applications in soil(s), water, waste, sludge, sediment, organic adsorbent material, and/or any other suitable matrix are increased with the use of controlled release catalyst material. In other words, controlled release catalyst materials when applied in combination with and/or in addition to redox material applications increase contaminant reduction. This increase in contaminant reduction may occur by one of several mechanisms or a combination thereof. Controlled release catalysts may be added to, or included with, a number of the treatment methods described previously. The use of controlled release catalyst(s) can overcome many of the technical challenges related to solubility and the relatively short duration of chemical availability with catalyst(s). Controlled release catalysts facilitate sufficient contact (both temporally and spatially) with the contaminated media as well as the reactive materials. Installation logistics are simplified as a result and remediation outcomes are improved.

In yet another embodiment of the present invention, a process for increasing the in situ efficacy of biological treatment material, deployed in soil(s), water, waste, sludge, sediment, organic adsorbent material, and/or any other suitable matrix is provided. The application of controlled release organic substrate(s), and/or microbial nutrient(s), and/or oxygen releasing compound(s), and/or pH buffering agent(s) within and/or adjacent to biological microbe(s), wherein at least one microbe of said biological microbe(s) is capable of utilizing at least one contaminant of concern for at least one part of a metabolic process, wherein said application of said controlled release organic substrate(s), and/or microbial nutrient(s), and/or oxygen releasing compound(s), and/or pH buffering agent(s) comprises the steps of: a) placement of said controlled release organic substrate(s), and/or microbial nutrient(s), and/or oxygen releasing compound(s), and/or pH buffering agent(s) within and/or adjacent to microbes; b) releasing at least one organic substrate(s), and/or microbial nutrient(s), and/or oxygen releasing compound(s), and/or pH buffering agent(s) from said controlled release organic substrate(s), and/or microbial nutrient(s), and/or oxygen releasing compound(s), and/or pH buffering agent(s) material(s) over a period of time exceeding the residence time or contact time of a organic substrate(s), and/or microbial nutrient(s), and/or oxygen releasing compound(s), and/or pH buffering agent(s) applied in solution; c) contacting at least a portion of said microbes with at least a portion of said organic substrate(s), and/or microbial nutrient(s), and/or oxygen releasing compound(s), and/or pH buffering agent(s) d) improving, increasing, or supporting at least a portion of said microbial metabolic process with at least a portion of said organic substrate(s), and/or microbial nutrient(s), and/or oxygen releasing compound(s), and/or pH buffering agent(s). Said controlled release organic substrate(s), and/or microbial nutrient(s), and/or oxygen releasing compound(s), and/or pH buffering agent(s) contributes to, whether directly or indirectly, the reduction and/or treatment of at least one contaminant of concern within the target matrix.

The performance, efficiency, and/or longevity of microbiologically mediated contaminant treatment of target matrices is increased with the in situ application and/or addition of controlled release organic substrate(s), and/or microbial nutrient(s), and/or oxygen releasing compound(s), and/or pH buffering agent(s) within and/or adjacent to biological microbe(s). In other words, controlled release organic substrate(s), and/or microbial nutrient(s), and/or oxygen releasing compound(s), and/or pH buffering agent(s) when applied in combination with and/or adjacent to biological microbes increase contaminant reduction. This increase in contaminant reduction may occur by one of several mechanisms or a combination thereof.

Mechanisms for increased contaminant reduction include but are not limited to: eliminating and/or reducing the negative impact that results from the in situ application of sparingly soluble compounds. As previously discussed, such sparingly soluble compounds are difficult to deploy and typically become coated/covered (rendering them unavailable) or consumed prior to fully contributing to the desired biological remediation process. As such, incomplete contaminant treatment and/or transformation can occur.

In at least one embodiment of the present disclosure, a controlled release adjunct/amendment configured to be controllably released into an environment having at least one contaminant and at least one reactant or at least one biological agent is provided. The adjunct/amendment may be void of reactants and biological agents. The adjunct/amendment may be configured to aid the treatment of an environmental media having a contaminant. For example, the adjunct/amendment may be configured to aid in a reaction or biological activity used in environmental remediation or may be configured to aid in the treatment process.

At least one embodiment of the present disclosure provides a controlled release adjunct/amendment configured to be controllably released into an environment having at least one contaminant and at least one reactant or at least one biological agent, wherein the at least reactant or the at least one biological agent are configured to transform the at least one contaminant into at least one less harmful constituent, wherein the adjunct/amendment is configured to be disposed with, proximate with, or proximate to the at least one contaminant and the at least one reactant or the at least one biological agent, the adjunct/amendment having a size, shape, surface area, composition, binding agent or coating for controlling the release of the adjunct/amendment into the environment, the adjunct/amendment being configured to aid in the transformation of the at least one contaminant into the at least one less harmful constituent, or aid in the dispersion of the products of the transformation.

One feature or aspect of an illustrative example is believed at the time of the filing of this patent application to possibly reside broadly in a process for in situ treatment of contaminated soil(s), water, waste, sludge, wastewater, sediment, other contaminated matrix, or combination thereof, the process comprising the steps of: applying a redox material to the contaminated matrix or in a flow path of the contaminant in the matrix; applying an adjunct to the contaminated matrix or in a flow path of the contaminant in the matrix; wherein the adjunct is configured to be controllably released and is selected from the group consisting of chelating agents, ligands, catalysts, and combinations thereof; controlling the release of the adjunct into the matrix; reducing at least one contaminant in the contaminated soil(s), water, waste, sludge, wastewater, sediment, other contaminated matrix, or combination thereof with the redox material; and contributing to the reduction of the at least one contaminant in the contaminated soil(s), water, waste, sludge, wastewater, sediment, other contaminated matrix, or combination thereof, with the adjunct.

Another feature or aspect of an illustrative example is believed at the time of the filing of this patent application to possibly reside broadly in the redox material being selected from the group consisting of ozone, peroxide, persulfate, permanganate, metabisulfite, polysulfide, iron, zinc, copper-based constituent, zero-valent iron, zero-valent zinc, zero valent copper, and combinations thereof.

Yet another feature or aspect of an illustrative example is believed at the time of the filing of this patent application to possibly reside broadly in the adjunct being selected from the group consisting of metal catalyst, EDTA, disodium EDTA, tetrasodium EDTA, DTPA, sodium acetate, ammonium oxalate, sodium dithionite, sodium citrate, hydroxylamine hydrochloride, and combinations thereof.

Still another feature or aspect of an illustrative example is believed at the time of the filing of this patent application to possibly reside broadly in the redox material being configured to be controllably released and the process further comprises controlling the release of the redox material into the matrix.

A further feature or aspect of an illustrative example is believed at the time of the filing of this patent application to possibly reside broadly in the applying of the adjunct comprising applying the adjunct with, or up gradient from, the applying of the redox material.

Another feature or aspect of an illustrative example is believed at the time of the filing of this patent application to possibly reside broadly in a process for in situ treatment of contaminated soil(s), water, waste, sludge, wastewater, sediment, other contaminated matrix, or combination thereof, the process comprising the steps of: applying a reactive or treatment material to the contaminated matrix or in a flow path of the contaminant in the matrix; applying an adjunct to the contaminated matrix or in a flow path of the contaminant in the matrix; wherein the adjunct is configured to be controllably released and to contribute to the treatment of the soil(s), water, waste, sludge, wastewater, sediment, other contaminated matrix, or combination thereof, controlling the release of the adjunct into the matrix; and treating the soil(s), water, waste, sludge, wastewater, sediment, other contaminated matrix, or combination thereof with the reactive or treatment material and the adjunct and thereby transforming at least one contaminant into at least one product having less hazardous characteristics than the at least one contaminant.

Yet another feature or aspect of an illustrative example is believed at the time of the filing of this patent application to possibly reside broadly in the reactive or treatment material comprising at least one reactive redox material.

Still another feature or aspect of an illustrative example is believed at the time of the filing of this patent application to possibly reside broadly in the adjunct being selected from the group consisting of catalyst, EDTA, disodium EDTA, tetrasodium EDTA, DTPA, sodium acetate, ammonium oxalate, sodium dithionite, sodium citrate, hydroxylamine hydrochloride, and combinations thereof.

A further feature or aspect of an illustrative example is believed at the time of the filing of this patent application to possibly reside broadly in an in situ efficacy of the reactive or treatment material being increased, improved, or enhanced with the adjunct in the treating of the soil(s), water, waste, sludge, wastewater, sediment, other contaminated matrix, or combination thereof.

Another feature or aspect of an illustrative example is believed at the time of the filing of this patent application to possibly reside broadly in the adjunct comprising at least one chelating agent or at least one ligand, and wherein the treating of the soil(s), water, waste, sludge, wastewater, sediment, other contaminated matrix, or combination thereof comprises at least one of mitigating scaling of the redox material and mitigating permeability loss within the matrix.

Yet another feature or aspect of an illustrative example is believed at the time of the filing of this patent application to possibly reside broadly in the step of applying a reactive or treatment material and the step of applying an adjunct comprising applying the reactive or treatment material and the adjunct at substantially the same location in the matrix.

One feature or aspect of an illustrative example is believed at the time of the filing of this patent application to possibly reside broadly in at least one of the steps of the applying a reactive or treatment material and the applying an adjunct comprises applying in a permeable reactive barrier.

Another feature or aspect of an illustrative example is believed at the time of the filing of this patent application to possibly reside broadly in the step of applying a reactive or treatment material comprises applying the reactive or treatment material at a first location in the matrix and the step of applying an adjunct comprises applying the adjunct at a second location in the matrix, wherein the first location is different than the second location.

Yet another feature or aspect of an illustrative example is believed at the time of the filing of this patent application to possibly reside broadly in the first location comprising a first permeable reactive barrier in the flow path of the contaminant in the matrix the second location comprising a second permeable reactive barrier in the flow path of the contaminant in the matrix.

Still another feature or aspect of an illustrative example is believed at the time of the filing of this patent application to possibly reside broadly in the second permeable reactive barrier being up gradient of the first reactive barrier.

A further feature or aspect of an illustrative example is believed at the time of the filing of this patent application to possibly reside broadly in the process comprising a step of applying a permeable material in the permeable reactive barrier.

Another feature or aspect of an illustrative example is believed at the time of the filing of this patent application to possibly reside broadly in the permeable material being selected from the group consisting of sand(s), gravel(s), polymer bead(s), organic adsorbent material(s), activated carbon, wood(s), coal(s), coconut shell, and combinations thereof.

Yet another feature or aspect of an illustrative example is believed at the time of the filing of this patent application to possibly reside broadly in the process comprising applying the permeable material with the reactive or treatment material and the adjunct, wherein the reactive or treatment material comprises a redox material and the adjunct comprises at least one chelating agents or at least one ligand.

Still another feature or aspect of an illustrative example is believed at the time of the filing of this patent application to possibly reside broadly in the adjunct being configured to be controllably released over a time period of time.

A further feature or aspect of an illustrative example is believed at the time of the filing of this patent application to possibly reside broadly in controlling the release of the adjunct for at least one day.

Another feature or aspect of an illustrative example is believed at the time of the filing of this patent application to possibly reside broadly in the process comprising preventing or reducing the scaling of the redox material.

Yet another feature or aspect of an illustrative example is believed at the time of the filing of this patent application to possibly reside broadly in the process comprising preventing or reducing the permeability loss within the matrix.

Still another feature or aspect of an illustrative example is believed at the time of the filing of this patent application to possibly reside broadly in the adjunct having a size, shape, surface area, composition, binding agent, or coating for the controlling of the release of the adjunct controlling the release into the matrix.

The purpose of the statements about the needs, object, or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as that may be filed. Therefore, any statements made in this disclosure are not intended to limit claims in any manner and should not be interpreted as limiting.

It will be understood that the examples of patents, published patent applications, and other documents which are referenced in this application and which are referred to, or incorporated by reference, herein may possibly be used in embodiments of the present application.

The following references are hereby incorporated by reference herein:

REFERENCES

| Pub Year | Author(s) | Publication Name | Citation | Title |
|---|---|---|---|---|
| 2000 | Garrabrants, Andrew et al | Waste Management | 20; 155-165 | Use of chelating agent to determine the metal availability for leaching from soils and wastes |
| 1991 | Ryan, Josheph N. et al | Clays and Clay Minerals | Vol. 39, No. 5, 509-518 | Extraction of iron oxides from sediments using reductive dissolution by titanium (III) |
| 2011 | Fjordboge, Annika S. | Technical University of Denmark (DTU Library) | PhD Thesis, April 2011 | Source zone remediation by zero valent iron technologies |
| 2004 | Morrison, Stan J., et al | US Dept. of Energy | Doc No. B0005900 | Rejuvenating Permeable Reactive Barriers by Chemical Flushing |
| 2005 | Morrison, Stan J., et al | US Dept. of Energy | Doc No. S0165400 | Performance Assmt and Recommendations-Rejuvenation of a PRB Cotter Corp. Uranium Mill |
| 1980 | Motekaitis, Ramunas J., et al | Canadian Journal of Chemistry | Vol. 58; No. 19 | The iron(III)-catalyzed oxidation of EDTA in aqueous solution |

-continued

REFERENCES

| Pub Year | Author(s) | Publication Name | Citation | Title |
|---|---|---|---|---|
| 1989 | Borggaard, Ole K. | Proceedings of the 9th International Clay Conference, Strasbourg | Vol. 1 | Kinetics and mechanisms of soil iron oxide dissolution in EDTA, oxalate and dithioniate |
| 2011 | Higgins, Monica R. | PhD Dissertation | University of Michigan (Env Eng) | Environmental assessment of in situ groundwater remediaiton with reduced iron reactive media |
| 2017 | Fradel, Joel, et al | NJDEP Site Remediation and Waste Mgmt Prgm | October 2017; Vol. 1 | In Situ Remediation: Design Considerations and Performance Monitoring Technical Guidance Document |
| 2014 | Olson, Mitchell R. | PhD Dissertation | Colorado State University (Civil & Env Eng) | Remediation of soil impacted with chlorinated organic compounds: soil mixing with zero valent iron and clay |
| 2017 | Khalil, Ahmed M. E., et al | Evergreen | Vol. 04; Issue 01: 21-28 | Treatment and Regeneration of Nano-scale Zero-valent Iron Spent in Water Remediation |
| 2001 | Gill, Jasbir S., et al | U.S. Pat. No. | 6,310,024 | Rust and scale removal composition and process |
| 2012 | Horiba Scientific | Product Info | PSA Guidebook | A Guidebook to Particle Size Analysis |
| 2014 | Scalzi, Michael | U.S. Pat. No. | 8,766,030 | Utilization of ferric ammonium citrate for in situ remediation of chlorinated solvents |
| 2015 | Scalzi, Michael | U.S. Pat. No. | 9,126,245 | Chemical oxidation and biological attenuation process for the treatment of contaminated media |
| 2015 | Scalzi, Michael, et al | U.S. Pat. No. | 9,126,244 | Use of encapsulated substrates that control the release rates of organic hydrogen donors |
| 2016 | Scalzi, Michael, et al | U.S. Pat. No. | 9,427,786 | Chemical oxidation and biological attenuation process for the treatment of contaminated media |
| 2004 | Noland, Scott, et al | U.S. Pat. No. | 6,787,034 | Compositions for removing hydrocarbons and halogenated hydrocarbons from contaminated environments |
| 2012 | Noland, Scott, et al | U.S. Pat. No. | 8,097,559 | Compositions for removing halogenated hydrocarbons from contaminated environments |
| 2013 | Noland, Scott, et al | U.S. Pat. No. | 8,618,021 | Method of manufacturing compositions for removing halogenated hydrocarbons from contaminated environments |
| 2016 | Noland, Scott, et al | U.S. Pat. No. | 9,352,987 | Method of manufacturing compositions for removing halogenated hydrocarbons from contaminated environments |
| 2018 | Noland, Scott | U.S. Pat. No. | 9,950,353 | Bioremediation composition with time-release materials for removing energetic compounds from contaminated environments |
| 2018 | Noland, Scott, et al | U.S. Pat. No. | 10,000,394 | Compositions for removing hydrocarbons and halogenated hydrocarbons from contaminated environments |
| 2013 | Taylor, Jesse | Remingon Tech | presentation | COGAC ™—Chemically Oxidized Granular Activated Carbon |
| 2019 | Popovic, Jovan, et al | ESTCP Fact Sheet | BI0117191429VBO | ER-201589-PR: Long-term performance monitoring of zedro-valen iron sites |
| 1996 | Gillham, Robert, et al | U.S. Pat. No. | 5,534,154 | System for cleaning contaminated soil |
| 2000 | Seech, Alan G., et al | U.S. Pat. No. | 6,083,394 | Composition and method for dehalogenation and degradation of halogenated organic contaminants |

REFERENCES -continued

| Pub Year | Author(s) | Publication Name | Citation | Title |
|---|---|---|---|---|
| 2006 | Reinhart, Debra R., et al | U.S. Pat. No. | 7,037,946 | Zero-valent metal emulsion for reductive dehalogenation of DNAPLS |
| 2013 | Taylor, Jesse C | U.S. Pat. No. | 8,480,903 | Systems and methods for in-situ contaminant remediation |
| 2017 | Kinsman, Larry, et al | U.S. Pat. No. | 9,561,530 | Method for the in situ remediation of conminants |
| 2016 | Huang, Yongheng | U.S. patent application | US 2016/0052808 | Zero-valent iron systems and methods for treatment of contaminated wastewater |
| 2009 | Cook, Sean M. | Jackson State University Report for US EPA | August 2009 report | Assessing the Use and Application of Zero-Valen Iron Nanoparticle Technology for Remediation at Contaminated Sites |

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The present disclosure is not to be limited in terms of the particular examples or embodiments described in this application, which are intended as illustrations of various aspects. Many modifications and variations can be made without departing from its spirit and scope, as will be apparent to those skilled in the art. Functionally equivalent materials, equipment, methods, and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular size or shape, methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A process for in situ treatment of contaminated soil(s), water, waste, sludge, wastewater, sediment, other contaminated matrix, or combination thereof, the process comprising the steps of:
    applying a redox material to the contaminated matrix, or in a flow path of the contaminant, in a first permeable reactive barrier in the matrix;
    applying an adjunct to the contaminated matrix, or in a flow path of the contaminant, in a second permeable reactive barrier in the matrix;
    wherein the second permeable reactive barrier is up gradient from the first permeable reactive barrier and is void of the redox material;
    wherein the adjunct is selected from the group consisting of chelating agents, ligands, and combinations thereof and is void of the redox material;
    controlling the release of the adjunct into solution in the matrix over a period of time exceeding a period of time for the adjunct to flow through the first permeable reactive barrier having the redox material;
    wherein the controlling the release of the adjunct is performed independently of the step of applying a redox material;
    reducing the quantity of at least one contaminant in the contaminated soil(s), water, waste, sludge, wastewater, sediment, other contaminated matrix, or combination thereof with the redox material;
    contributing to the treatment of the at least one contaminant in the contaminated soil(s), water, waste, sludge, wastewater, sediment, other contaminated matrix, or combination thereof, with the adjunct; and
    wherein the contributing to the treatment comprises at least one of mitigating scaling of the redox material and mitigating permeability loss within the matrix.

2. The process of claim 1, wherein the redox material is selected from the group consisting of ozone, peroxide, persulfate, permanganate, metabisulfite, polysulfide, iron-based, zinc-based, copper-based constituent, and combinations thereof.

3. The process of claim 1, wherein the adjunct is selected from the group consisting of EDTA, disodium EDTA, tetrasodium EDTA, DTPA, sodium acetate, ammonium oxalate, sodium dithionite, sodium citrate, hydroxylamine hydrochloride, and combinations thereof.

4. A process for in situ treatment of contaminated soil(s), water, waste, sludge, wastewater, sediment, other contaminated matrix, or combination thereof, the process comprising the steps of:
    applying a redox material in a first reactive barrier in the contaminated matrix, or in a flow path of the contaminant in the matrix;
    applying an adjunct comprising at least one chelating agent or at least one ligand in a second reactive barrier in the contaminated matrix, or in a flow path of the contaminant in the matrix;
    wherein the second permeable reactive barrier is up gradient from the first permeable reactive barrier and is void of the redox material;
    independently controlling the release of the adjunct into solution in the matrix over a period of time exceeding a period of time for the adjunct to flow through the first permeable reactive barrier having the redox material;
    treating the soil(s), water, waste, sludge, wastewater, sediment, other contaminated matrix, or combination thereof, with the redox material and the adjunct, and thereby transforming at least one contaminant into at least one product having less hazardous characteristics than the at least one contaminant; and
    wherein the treating further comprises at least one of mitigating scaling of the redox material and mitigating permeability loss within the matrix.

5. The process of claim 4, wherein the adjunct is selected from the group consisting of EDTA, disodium EDTA, tetrasodium EDTA, DTPA, sodium acetate, ammonium oxalate, sodium dithionite, sodium citrate, hydroxylamine hydrochloride, and combinations thereof.

6. The process of claim 4, wherein an in situ efficacy of the redox material is increased, improved, or enhanced with the adjunct in the treating of the soil(s), water, waste, sludge, wastewater, sediment, other contaminated matrix, or combination thereof.

7. The process of claim 4 further comprising a step of applying a permeable material in at least one of the permeable reactive barriers.

8. The process of claim 7, wherein the permeable material is selected from the group consisting of sand(s), gravel(s), polymer bead(s), organic adsorbent material(s), activated carbon, wood(s), coal(s), coconut shell, and combinations thereof.

9. The process of claim 7 comprising applying the permeable material with the redox material and the adjunct.

10. The process of claim 4 comprising controlling the release of the adjunct for at least one day.

11. The process of claim 4 comprising preventing or decreasing the scaling of the redox material.

12. The process of claim 4 comprising preventing or decreasing the permeability loss within the matrix.

13. The process of claim 4, wherein the adjunct has a size, shape, surface area, composition, binding agent, or coating for the controlling of the release of the adjunct into the matrix.

* * * * *